Dec. 1, 1953   J. E. DELANEY   2,660,798
DIAL INDICATOR GAUGE
Filed Jan. 9, 1951

INVENTOR
JOHN E. DELANEY
BY Dawly + Dawly
ATTORNEYS

Patented Dec. 1, 1953

2,660,798

UNITED STATES PATENT OFFICE 2,660,798

DIAL INDICATOR GAUGE

John E. Delaney, Rhinebeck, N. Y., assignor to Standard Gage Company, Inc., Poughkeepsie, N. Y., a corporation of New York Application January 9, 1951, Serial No. 205,139

5 Claims. (Cl. 33—172)

The present invention relates to dial indicator gages of the type commonly used for the gaging of linear dimensions.

More particularly still the instant invention relates to a dial indicator gage adapted to directly indicate the difference between the maximum and minimum diameter of a measured circular or cylindrical object.

In many circumstances it is necessary that a cylindrical object not deviate from the true cylinder. An example is a shell for a gun where obviously any out-of-round condition would preclude the use of the shell in a gun. In the past it has been customary to determine out-of-round of a shell by measuring its diametrical dimension as the shell rotated. This method requires the reading of the gage to determine the maximum and minimum indications thereof as the gage pointer fluctuates between the maximum and the minimum indication. Obviously this is difficult and particularly so when it is considered that a shell or blank cylindrical object must be gaged at many points along its length, making it necessary for the inspector to read a plurality of dial indicator gages.

In my present invention I provide an auxiliary movable scale cooperating with a modified indicator hand or pointer and with an added manually operable pointer so that the indicator yields a reading of the maximum diametrical dimension of the piece measured as well as a minimum diametrical dimension. The difference which is directly readable upon the scale is clearly the amount of out-of-round condition of the measured cylinder.

It is an object of this invention to provide an improved dial indicator gage, the parts of which are so arranged that the amount of the out-of-round condition of a cylindrical piece can be directly read.

Another object of the invention is to provide such an indicator of out-of-roundness which is simple to fabricate and which consists essentially in minor modification of a common form of dial indicator gage.

It is a further object of the invention to provide a dial indicator gage of the class described which may be constructed at low cost and without difficulty of fabrication.

Other objects and features of the invention will appear when the following description is considered in connection with the annexed claims, in which, Figure 1 is a fragmentary elevation of a test arrangement for determining out-of-round condition of cylindrical objects showing the mounting of a dial indicator gage in accordance with my invention so that the measuring plunger thereof is in contact with the object being measured on a diameter thereof;

Figure 1:
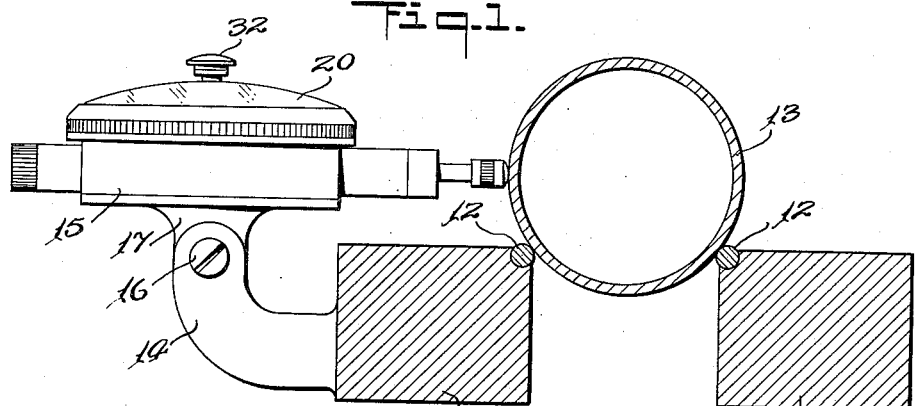
Figure 2:
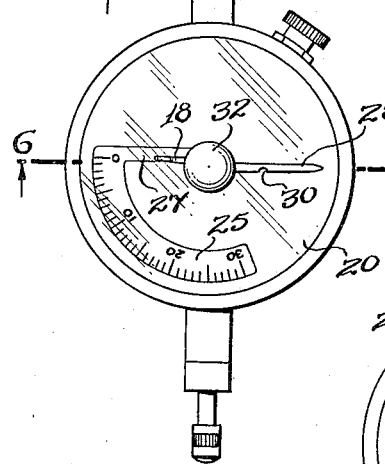
Figure 2 is a front elevation of the gage of my invention showing the parts in their inoperated position.
Figure 3:
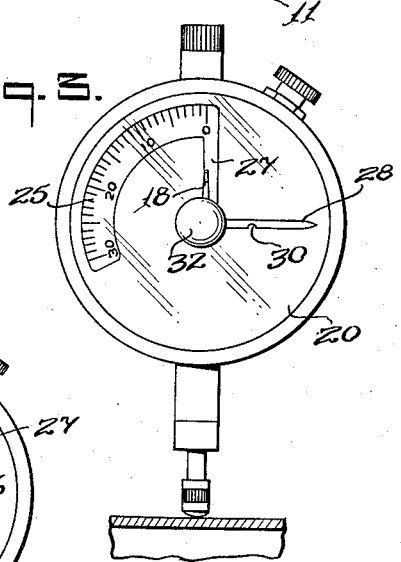
Figure 3 is a view similar to Figure 2 showing the parts after the cylindrical object has been rotated through a complete revolution so that the indicator pointer has moved to a position to indicate the maximum diameter of the piece. It will be noted in this view that the scale has been moved with the indicator pointer.
Figure 5:
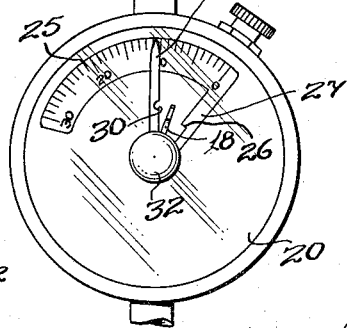
Figure 6:
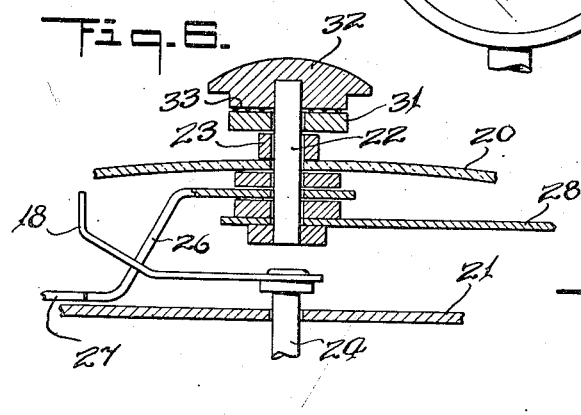
Figure 4:
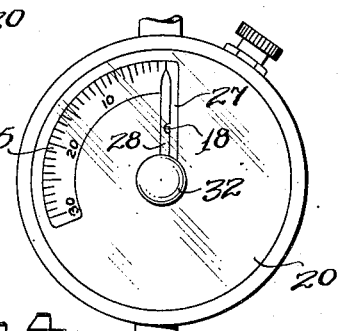
Figure 4 shows the indicator of Figures 2 and 3 but illustrates a further step in the operation of the gage, namely, the manual movement of the auxiliary hand or pointer to a position adjacent to that of the normal indicator pointer.

Figure 5 is a view similar to Figures 2 through 4 but showing the auxiliary pointer moved backwardly by the indicator pointer as the piece continues to revolve, the distance between zero point on the scale and the scale position indicated by the auxiliary pointer being the maximum excursion of the indicator pointer as the supposedly cylindrical piece rotates; and Figure 6 is a fragmentary cross-sectional view taken along the line 6—6 of Figure 2 showing the relationship of the indicator pointer, the auxiliary pointer and the scale.

Referring now to the drawings, there are shown at 10 and 11 two blocks, each of which has a series of balls 12 rotatably mounted therein in such a manner as to form a rotatable support for a cylindrical piece 13. The blocks 10 and 11 with the balls 12 are a schematic representation of a common means for supporting a cylindrical object for rotation in order to determine whether or not it is truly cylindrical.

Fixed to the block 10 is a bracket 14 upon which the dial indicator 15 is supported, the bracket being fixed to the dial indicator by means of the screw 16 and the usual ear or lug 17 made integral with the rear housing of the dial indicator gage.

The dial indicator gage is of usual construction save for the fact that its pointer or hand 18, Figures 2 through 6, is shortened and is bent upwardly as is clearly indicated in Figure 6.

Additionally the dial indicator gage is slightly modified in that the glass face 20 thereof is spaced from the dial plate 21 by more than the normal amount. Supported in a hole in the glass face 20 is a shaft 22 which shaft is held in position by means of a collar 23 fixed to the shaft and bearing against the upper surface of the glass. The shaft 22 is coaxial with the shaft 24 on which the pointer 18 is mounted. Freely rotatable on shaft 22 is the scale sector 25 the zero point of which lies on the same radius as the base of a notch 26 in the scale supporting arm 27. Fixed for rotation with the shaft 22 is the auxiliary pointer 28 which pointer is notched at point 30 to receive the upwardly bent portion of the dial indicator pointer 18. Due to the arrangement of the notches 26 and 30 it will be seen that the pointer 28 may be set to the zero point of the scale 25.

Fixed to shaft 22 adjacent the upper end thereof is a collar 31 which may be driven by a manually operated knob 32 which knob is normally freely rotatable on the shaft 22, and which may be coupled to the collar 31 by pressure upon the knob 32 due to the use of the friction disk 33 between the upper surface of the collar and the lower surface of the knob.

Referring now to Figure 2, it will be seen that the dial indicator prior to the insertion of a piece 13 on the supports 10 and 11 is in the general condition illustrated, in which no indication is given. Upon the insertion of a piece such as 13 and the rotation of the piece through at least a portion of a revolution, the indicator pointer 18 moves clockwise and carries with it the freely rotatable sector scale 25. Thus, as shown in Figure 3, the sector scale 25 is positioned to indicate the maximum diametrical measurement of the piece 13 along the circumference against which the measuring plunger of indicator 15 bears. As the piece 13 continues to rotate under any suitable drive, the knob 32 is rotated in a clockwise direction while being pressed lightly downwardy. This carries the pointer 28 into a position in which the notch 30 therein bears against the left-hand edge of pointer 18. If the movement of the auxiliary pointer 28 occurs at a time when the indicator pointer 18 indicates the maximum diameter of the piece, then the auxiliary pointer 28 will momentarily occupy the position shown in Figure 4.

However, if it be assumed that the piece is not completely round, the indicator pointer 18 will move in a counterclockwise direction, thus forcing the pointer 28 to move in the same direction, the maximum movement being determined by the minimum diameter of the piece measured. The condition upon the completion of the measurement is clearly indicated at Figure 5. In this figure the pointer 18 is shown centrally of the sector scale supporting arm 27 and the auxiliary pointer 28. This is done in order to indicate that the pointer 18 fluctuates between the positions of sector scale 25 and auxiliary pointer 28. The scale reading given by the auxiliary pointer 28 is a direct indication of the amount of maximum variation of the diameter of the piece on the particular circumference against which the measuring plunger of indicator 15 bears.

While I have described the preferred embodiment of my invention, it will be understood that many modifications of the structure may be made within the scope of the invention. There I wish to be limited not by the foregoing description, but on the contrary, solely by the claims granted to me.

What is claimed is:

1. In a dial indicator adapted to give indications of variations in diameter and of the type having a shaft and a pointer mounted thereon, in combination, a shaft mounted coaxially with the pointer shaft of the gage, a sector scale rotatably mounted on said shaft, said sector scale having a portion thereof in the path of movement of said indicator pointer and being actuated by the indicator pointer during movement thereof in one direction, an auxiliary pointer, and means mounting said auxiliary pointer on said shaft in the path of movement of the indicator pointer, said auxiliary pointer being operated upon by the indicator pointer upon movement thereof in the opposite direction whereby the position of said auxiliary pointer on said sector scale gives a direct indication of the difference between maximum and minimum readings.

2. In a dial indicator adapted to give indications of variations in diameter and of the type having a shaft and a pointer mounted thereon and a glass over the dial face, in combination, a shaft mounted for rotation in the glass coaxially with the pointer shaft, a sector scale rotatably mounted on said shaft, said sector scale having a portion thereof in the path of movement of said indicator pointer and being actuated by the indicator pointer during movement thereof in one direction, an auxiliary pointer, means mounting said auxiliary pointer on said shaft with a portion thereof in the path of movement of said indicator pointer and said scale, said auxiliary pointer being manually operable to engage said indicator pointer and being operable by said pointer upon movement thereof in a direction opposite to that in which said indicator pointer moves said scale to thereby indicate on said scale the difference between maximum and minimum movements of the indicator pointer.

3. In a dial indicator gage, in combination, a rotatable pointer, a measuring plunger, means for transmitting movement from said measuring plunger to said pointer, a shaft mounted coaxially to the axis of said rotatable pointer, a circular scale rotatably mounted on said shaft, said circular scale being in the path of said pointer and being movable in one direction by said pointer and an auxiliary pointer mounted coaxially with said indicator pointer, said auxiliary pointer lying in the path of said indicator pointer and being movable thereby in the direction opposite to the movement of said scale whereby said auxiliary pointer cooperating with said scale will indicate the maximum amount of out-of-roundness of a measured work piece.

4. In a gage, an indicator, a scale lying in the path of movement of and movable by said indicator in one direction, an auxiliary indicator lying in the path of movement of and movable by said indicator in the opposite direction to that in which said scale is moved by said main indicator, said auxiliary indicator cooperating with said scale to thereby indicate on the scale the difference between a maximum and minimum indication.

5. In a dial indicator for directly indicating variations in diameter and of the type having a shaft, a pointer mounted thereon and a glass over the dial face, in combination, a shaft mounted for rotation in the glass, said shaft being coaxial with and in alignment with the pointer shaft, a sector scale, an arm integral with said sector scale, said arm being rotatably mounted on said shaft, said arm being bent downwardly and lying in the path of movement of the indicator pointer, an auxiliary pointer fixed to said shaft, said auxiliary pointer lying in the path of movement of said sector scale arm and of the indicator pointer, and manually operable means on said shaft for moving said auxiliary pointer to bring said sector scale arm against the indicator pointer and to bring said auxiliary pointer against the indicator pointer on the side opposite the sector scale arm whereby excursion of the indicator pointer will cause movement of the auxiliary pointer with respect to the sector scale to indicate directly the difference between maximum and minimum dimensions of a gaged circular workpiece as said workpiece is rotated in engagement with the dial indicator measuring plunger.

JOHN E. DELANEY.

References Cited in the file of this patent

UNITED STATES PATENTS

| Number | Name | Date |
| --- | --- | --- |
| 407,903 | Schlatter | July 30, 1889 |
| 1,431,999 | Walter | Oct. 17, 1922 |
| 1,888,298 | Teesdale | Nov. 22, 1932 |
| 1,898,552 | MacLaren | Feb. 21, 1933 |
| 2,501,033 | Denison | Mar. 21, 1950 |
| 2,605,736 | Cook | Aug. 5, 1952 |

FOREIGN PATENTS

| Number | Country | Date |
| --- | --- | --- |
| 332,237 | Great Britain | July 10, 1930 |